May 24, 1949.  J. H. MILLER  2,471,001
COMBINED OHMMETER AND ILLUMINATION METER
Filed Oct. 2, 1944
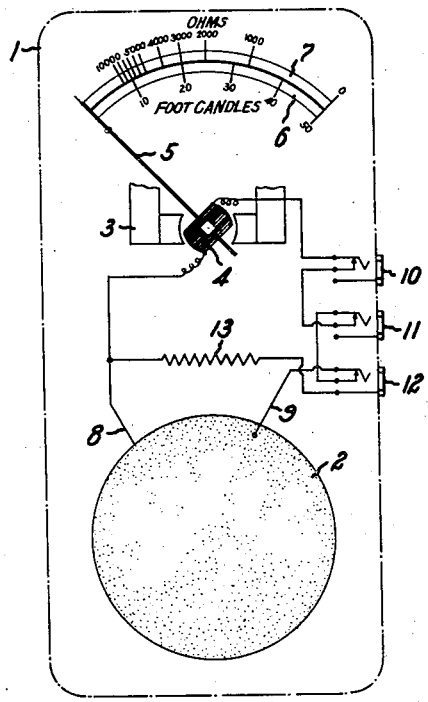
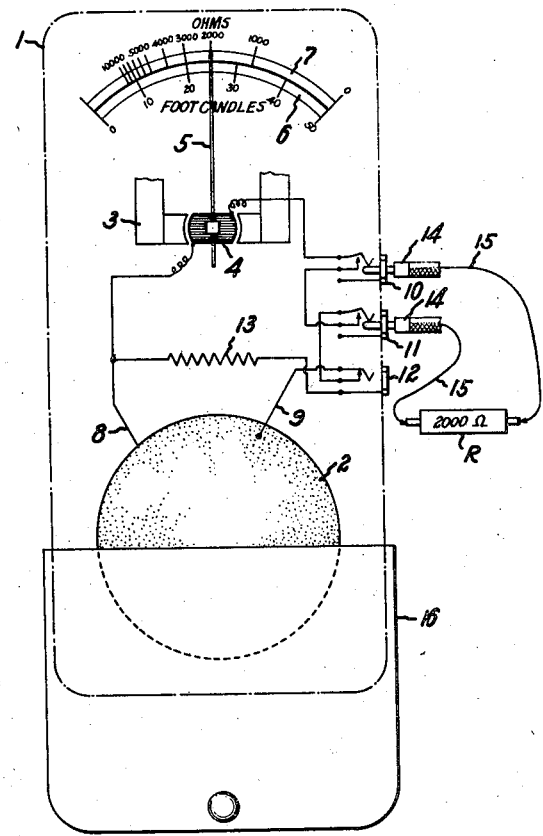
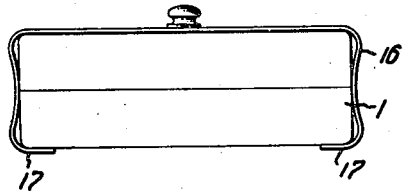
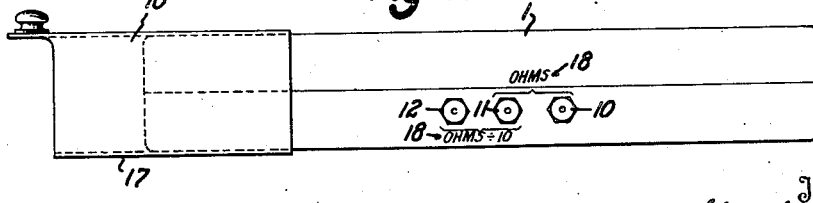
Inventor:
John H. Miller,
By Pierce & Scheffler
Attorneys.

Patented May 24, 1949

2,471,001

UNITED STATES PATENT OFFICE 2,471,001

COMBINED OHMMETER AND ILLUMINATION METER

John H. Miller, Short Hills, N. J., assignor to Weston Electrical Instrument Corporation, Newark, N. J., a corporation of New Jersey Application October 2, 1944, Serial No. 556,857

5 Claims. (Cl. 175—183)

1

This invention relates to photoelectric measuring apparatus, and particularly to dual purpose apparatus for measuring illumination or brightness values or, alternatively, for measuring resistance values or testing circuit continuity.

Illumination meters and brightness meters, including exposure meters for photographic use, have been manufactured commercially in small and readily portable size by combining sensitive electrical measuring instruments with "solid disk" or current-generating photoelectric cells of the current-generating type. Ohmmeters and continuity testing apparatus must include a current source and, when manufactured in small size and portable form, have been energized by small dry cells or batteries such as used in flashlights and portable radio receivers. Such testing apparatus has been quite satisfactory when in continuous use or in such frequent use that the dry cells or batteries are promptly replaced when exhausted. When the ohmmeter is used only from time to time, the dry batteries may have failed after the last prior use and the ohmmeter is inoperative if replacement batteries are not readily available. The loss of time incident to the obtaining of replacement batteries is an annoyance and serious disadvantage in the use of the prior ohmmeters when, as is not always possible, replacement batteries can be obtained.

An object of the present invention is to provide ohmmeters of small portable size in which the current source is a current-generating photoelectric cell. An object is to provide photoelectric measuring apparatus that may be employed in the measurement of illumination and/or brightness values or, alternatively, may be employed to measure resistance values or to test circuit continuity. More specifically, an object is to provide a dual purpose photoelectric measuring apparatus of the type including a current-generating photoelectric cell and an electrical measuring instrument connected to the cell, the instrument having a double scale graduated in light values and in resistance values and the circuit connections between the cell and instrument including jacks for the reception of test leads that may be connected across a circuit element of unknown resistance.

These and other objects and advantages will be apparent from the following specification when taken with the accompanying drawing in which:

Fig. 1 is a schematic view and circuit diagram of an embodiment of the invention as adjusted for the measurement of light values;

2

Fig. 2 is a similar schematic view and circuit diagram of the instrument as adjusted for the measurement of resistance values;

Fig. 3 is an end elevation of an instrument casing and adjustable light shield; and Fig. 4 is a side elevation of the same.

In Figs. 1 and 2 of the drawings, the broken line indicates the casing 1 which houses a current-generating photocell 2 and a sensitive measuring instrument including a permanent magnet 3 and a pivotally mounted coil 4 carrying a pointer 5 that moves over a scale plate having a scale 6 graduated in light values, for example foot-candles, and a scale 7 graduated in resistance values. The photocell 2 is connected across the coil 4 by a wire or lead 8 and a connection 9 that includes the normally closed contact blades of a plurality of pin jacks 10, 11, 12. The pin jacks are of the conventional type in which an inserted pin separates the contact blades and makes an electrical contact with the base of the jack and with only one of the contact blades. A resistor 13 is connected between the lead 8 and the base contact of the pin jack 12.

The described apparatus functions in the usual manner as a light meter when the pin jacks 10—12 are in normal closed condition. The pointer displacement is a measure of illumination when, as illustrated, light rays reach the photocell over a "solid angle" of 180° and is a measure of brightness when a permanent or a movable baffle limits the angle over which light rays may reach the photocell.

The apparatus is conditioned for use as an ohmmeter by inserting the pins 14 of a pair of test leads 15 in two of the pin jacks 10—11 and adjusting a light shield 16 to limit the light reaching photocell 2 to that value for which the pointer 5 is alined with the upper or "zero" graduation of the ohms scale 7 when the leads 15 are short-circuited. The resistance of unknown resistor R can then be measured by connecting the test leads 15 across the resistor.

The graduations of the ohms scale 7 are determined by the resistance of the circuit comprising movable coil 4 and the photocell 2. Assuming a circuit resistance of 2000 ohms and a foot-candle scale 6 of 50 uniform divisions, the central graduation of the ohms scale 7 will be "2000 ohms" when the pins 14 are in the jacks 10, 11 and the light reaching the photocell produces a full scale pointer deflection with the leads short-circuited. A pointer deflection to the first division on the 50-division scale will correspond to an external resistance of 100,000 ohms. The pin jack 12 and shunt resistor 13 provide a second range of resistance measurement corresponding, preferably, to a decimal fraction of the scale 7 value indicated by the pointed position. The second range and, if desired, additional "multiplier" ranges afford accurate measurements of low resistance values.

As shown in Figs. 3 and 4, the adjustable light shield may be a plate of resilient sheet metal bent to U-form with inturned flanges 17 that yieldingly retain the shield in adjusted position on the casing 1. Appropriate legends 18 may be located on the casing 1 adjacent the pin jacks to indicate the particular measuring range established when the pins of the test leads are inserted in the several jacks.

The adjustment of the cell illumination to that value at which the generated current produces a full scale deflection may be effected, in part or entirely, by moving the apparatus bodily with respect to a light source. For the particular illustrated embodiment, the full scale pointer deflection corresponds to 50 foot-candles at the photocell, and this illumination may be obtained from daylight room lighting or a flashlight. If sufficient light is not available to obtain a full scale deflection with no external resistance in the photocell-instrument circuit, the apparatus is useful as a continuity meter so long as the incident light is sufficient to produce an appreciable pointer displacement.

The invention is not limited to the particular embodiment herein shown and described as there is considerable latitude in the design of the illumination meter per se and in the adjustable light shield for regulating the light energy reaching the photocell when the device is employed as an ohmmeter or continuity testing device.

I claim:

1. In an electrical measuring instrument, a current-generating photocell, a measuring instrument having scale means comprising a scale graduated in resistance values, said instrument including a permanent magnet establishing a magnetic field and a coil pivotally mounted for movement in said magnetic field and carrying a pointer movable along said scale means, terminal members across which a resistance may be connected for measurement of its magnitude, circuit elements connecting said photocell and moving coil in series circuit with said terminal members, and adjustable light shield means for controlling the light reaching said photocell to regulate the current output to bring the instrument pointer to the zero scale graduation when said terminal members are short-circuited.

2. In an electrical measuring instrument, the invention as recited in claim 1 wherein said photocell and measuring instrument are housed in a common casing, and said light shield means includes a member supported upon said casing for adjustment to block light rays from a portion of said photocell.

3. A double purpose photoelectric measuring apparatus comprising a current-generating photocell, light shield means adjustable progressively from an inoperative position to prevent more or less of the approaching light rays from reaching said photocell, a measuring instrument having scale means provided with two reversely graduated scales, said instrument including a permanent magnet establishing a magnetic field and a pivotally mounted coil movable in said magnetic field and carrying a pointer movable along said scale means, circuit elements connecting said coil and photocell in series, one of said scales being graduated in values of light energy incident upon the photocell when said light shield means is adjusted to inoperative position, a pair of terminals across which a resistance may be connected for measurement of its magnitude, and means for connecting said terminals to said circuit elements and in series with said coil and photocell, the graduations of the second scale being in resistance values and the apparatus being adjusted for resistance measurements by short circuiting said terminals and adjusting said light shield means to bring the instrument pointer to the zero resistance graduation.

4. A double purpose photoelectric apparatus as recited in claim 3, wherein said circuit elements include normally closed pin jacks, and said means for connecting said terminal to said circuit elements comprises a pair of test leads each having one of said terminals at one end thereof and a pin at the other end for insertion in a pin jack.

5. In an ohmmeter, a measuring instrument having a permanent magnet and a moving coil carrying a pointer movable along a scale graduated in resistance values, said permanent magnet having spaced poles across which a magnetic field is established and said coil being pivotally supported for movement in said magnetic field, a current-generating photocell in series with said moving coil, light shield means adjustable with respect to said photocell to limit the light energy incident upon said photocell to that value at which the pointer is displaced to the uppermost mark of the scale, and means for connecting a resistor in series circuit with said photocell and moving coil to measure the resistance value thereof.

JOHN H. MILLER.

REFERENCES CITED

The following references are of record in the file of this patent:

UNITED STATES PATENTS

| Number | Name | Date |
|---|---|---|
| 1,049,040 | Bibb | Dec. 31, 1912 |
| 1,397,641 | Kolff | Nov. 22, 1921 |
| 1,729,517 | Neale | Sept. 24, 1929 |
| 1,887,421 | Newman | Nov. 8, 1932 |
| 1,897,330 | Pender | Feb. 14, 1933 |
| 1,954,329 | Schoenberg | Apr. 10, 1934 |
| 2,011,548 | Evans | Aug. 13, 1935 |
| 2,145,147 | Wolferz | Jan. 24, 1939 |
| 2,149,285 | Graham | Mar. 7, 1939 |
| 2,194,031 | Riszdorfer | Mar. 19, 1940 |
| 2,233,646 | Smith | Mar. 4, 1941 |

OTHER REFERENCES

Blackwell et al.: Wireless World, Oct. 1943, pp. 288–292.